US012271122B2

(12) United States Patent
Okabe et al.

(10) Patent No.: US 12,271,122 B2
(45) Date of Patent: Apr. 8, 2025

(54) WASTE TONER CONTAINER, MANUFACTURING METHOD, AND IMAGE FORMING APPARATUS

(71) Applicant: KONICA MINOLTA, INC., Tokyo (JP)

(72) Inventors: Madoka Okabe, Toyokawa (JP); Junichi Tanimoto, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/212,046

(22) Filed: Jun. 20, 2023

(65) Prior Publication Data

US 2023/0418183 A1 Dec. 28, 2023

(30) Foreign Application Priority Data

Jun. 28, 2022 (JP) ................................ 2022-103628

(51) Int. Cl.
*G03G 15/08* (2006.01)
*G03G 21/16* (2006.01)

(52) U.S. Cl.
CPC ..... *G03G 15/0889* (2013.01); *G03G 15/0881* (2013.01); *G03G 21/1647* (2013.01); *G03G 21/1676* (2013.01)

(58) Field of Classification Search
CPC .. G03G 21/105; G03G 21/12; G03G 15/0875; G03G 15/0881; G03G 21/181
See application file for complete search history.

(56) References Cited

U.S. PATENT DOCUMENTS 6,055,406 A * 4/2000 Kawai .................... G03G 21/12 399/111
10,234,792 B2 * 3/2019 Eto .................... G03G 15/0889
2008/0031666 A1 * 2/2008 Tawada .................. G03G 21/12 399/360
2015/0185659 A1 * 7/2015 Konishi ............ G03G 15/0856 399/262
2016/0306298 A1 * 10/2016 Daniels .............. G03G 15/0874
2017/0102665 A1 * 4/2017 Kadowaki ........... G03G 21/105

FOREIGN PATENT DOCUMENTS

JP 2002-062735 A 2/2002
JP 2016-057611 A 4/2016

* cited by examiner

*Primary Examiner* — Jessica L Eley
(74) *Attorney, Agent, or Firm* — Squire Patton Boggs (US) LLP

(57) ABSTRACT

A toner container comprises: a container for containing toner; a stirring member provided inside the container and configured to stir the toner by rotating around an axis; an engaging member attached to one end of the stirring member and configured to engage with a peripheral edge portion of an opening formed in the container; and a drive transmission member attached to the engaging member and configured to rotate the stirring member around the axis. A method of manufacturing the toner container comprises the steps of: installing the stirring member inside of the container body and attaching the engaging member to one end of the stirring member to bring the engaging member into engagement with the peripheral edge portion of the opening; forming the container by welding the container body and the cover member to each other; and attaching the drive transmission member to the engagement member.

18 Claims, 12 Drawing Sheets

WASTE TONER CONTAINER, MANUFACTURING METHOD, AND IMAGE FORMING APPARATUS

Japanese patent application No. 2022-103628 filed on Jun. 28, 2022 including description, claims, drawings, and abstract the entire disclosure is incorporated herein by reference in its entirety.

BACKGROUND

Technical Field

The present invention relates to a toner container, a manufacturing method, and an image forming apparatus.

Description of the Related Art

There are image forming apparatuses that form an image on a sheet such as printing paper by an electrophotographic method. The image forming apparatus includes a toner container that contains toner. The toner container includes a stirring member for stirring and conveying the toner therein. The stirring member includes a shaft portion in which a screw is formed. One end of a shaft portion of the stirring member is inserted into a through hole formed in the toner container. The stirring member is attached to a drive transmission member outside the toner container via the through hole (for example, JP2002-62735A).

The toner container having the above configuration is attached to an image forming apparatus. When the toner container is attached to the image forming apparatus, the toner container is coupled to a drive unit in which a drive transmission member is rotationally driven by a motor. The motor rotates the drive unit. The drive unit rotates the stirring member inside the toner container via the drive transmission member. Thus, the toner container can convey toner in a predetermined direction while stirring the toner.

When the number of rotations of the stirring member is high, there is a possibility that the bearing portion generates heat due to friction caused by the rotation of the stirring member. When the temperature of the bearing portion becomes high, toner contained in a surrounding area of the bearing portion is melted. When the toner is melted, there is a possibility that the torque for rotating the stirring member is increased. In order to prevent this, it is preferable to keep the number of rotations of the stirring member low. A structure is conventionally adopted in which a reduction ratio is increased by making a radius of the drive transmission member greater than a radius of the drive unit. Therefore, the size of the drive transmission member attached to one end of the stirring member is increased.

The toner container generally includes a container body and a cover member welded to the container body. The toner container is formed as a container whose inside is sealed by welding of a cover member. For example, vibration welding is adopted for the welding of the container body and the cover member. In the vibration welding, each of the container body and the cover member is installed in a jig. The jig holds the container body and the cover member in a state of being joined to each other. Vibration is applied to the container body and the cover member in a state of being held by the jig, and thus joining portions of the container body and the cover member are welded.

In a conventional toner container, it is assumed that a drive transmission member is attached to one end of a stirring member prior to welding of a container body and a cover member. In this case, since the size of the drive transmission member is large, the jig cannot be appropriately installed during vibration welding. Therefore, in the conventional toner container, a problem occurs during welding, and it is difficult to ensure the hermeticity of the toner container. Conventionally, after the stirring member is installed inside the container body, the container body and the cover member are welded to each other in a state where the drive transmission member is not mounted. Further, conventionally, after the container body and the cover member are welded to each other, a method of fitting and attaching the drive transmission member to one end of the stirring member inserted into the through hole of the container body has been employed.

However, in the conventional method, the shaft portion of the stirring member in the container body cannot be held when the drive transmission member is fitted to one end of the stirring member. Therefore, there has been a problem that a stress at the time of the fitting acts on the shaft portion of the stirring member, the shaft portion is deformed inside the toner container, and in the worst case, the shaft portion is broken.

SUMMARY

The present invention is intended to solve the above-described conventional problems. Thus, the present invention is intended to provide a toner container in which a stirring member is prevented from being deformed or broken when a drive transmission member is attached to one end of the stirring member. The present invention is also intended to provide a method of manufacturing such a toner container, and an image forming apparatus including such a toner container.

First, the present invention is directed to a toner container.

In order to achieve at least one of the aforementioned objects, according to one aspect of the present invention, the toner container comprises: a container for containing toner; a stirring member provided inside the container and configured to stir the toner by rotating around an axis; an engaging member attached to one end of the stirring member and configured to engage with a peripheral edge portion of an opening formed in the container; and a drive transmission member attached to the engaging member and configured to rotate the stirring member around the axis.

Second, the present invention is also directed to a method of manufacturing a toner container that comprises: a container formed by a container body and a cover member; a stirring member that is provided inside the container and rotates around an axis to stir the toner; an engaging member attached to one end of the stirring member and configured to engage with a peripheral edge portion of an opening formed in the container body; and a drive transmission member mounted on the engaging member and configured to rotate the stirring member about the axis.

In order to achieve at least one of the aforementioned objects, according to one aspect of the present invention, the method comprises the steps of: installing the stirring member inside of the container body and attaching the engaging member to one end of the stirring member to bring the engaging member into engagement with the peripheral edge portion of the opening; forming the container by welding the container body and the cover member to each other after the engaging member is attached to one end of the stirring member; and attaching the drive transmission member to the engagement member after the container is formed.

Third, the present invention is directed to an image forming apparatus.

In order to achieve at least one of the aforementioned objects, according to one aspect of the present invention, the image forming apparatus comprises: a toner container. The toner container comprises: a container for containing toner; a stirring member provided inside the container and configured to stir the toner by rotating around an axis; an engaging member attached to one end of the stirring member and configured to engage with a peripheral edge portion of an opening formed in the container; and a drive transmission member attached to the engaging member and configured to rotate the stirring member around the axis.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
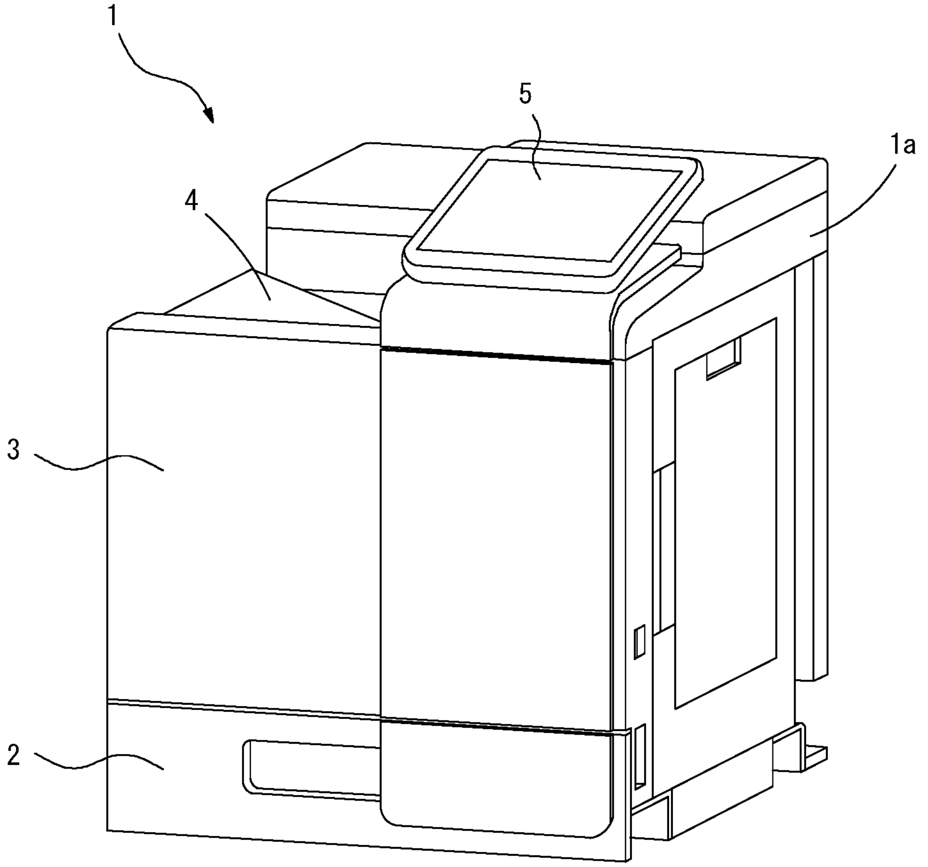
FIG. 1 is a diagram illustrating an example of an external configuration of an image forming apparatus.

FIG. 1 is a diagram illustrating an example of an external configuration of an image forming apparatus 1 according to an embodiment of the present invention. The image forming apparatus 1 is a printer that forms an image on a sheet such as a print sheet by an electrophotographic method. The image forming apparatus 1 is also capable of forming a color image by a tandem system. The image forming apparatus 1 includes a sheet feed cassette 2 at a lower part of a front side of an apparatus body 1*a*. The image forming apparatus 1 is capable of accommodating a sheet bundle including a plurality of sheets in a sheet feed cassette 2. An openable door 3 is provided at an upper portion of the sheet feed cassette 2 on the front side of the apparatus body 1*a*. In the image forming apparatus 1, internal components of the printer mechanism can be replaced by opening the openable door 3. In the image forming apparatus 1, a discharge tray 4 for discharging a sheet on which an image is formed is provided on a top portion of the apparatus body 1*a*. Furthermore, the image forming apparatus 1 is provided with an operation panel 5 for a user to perform various operations, on an upper front side of the apparatus body 1*a*.

Figure 2A:
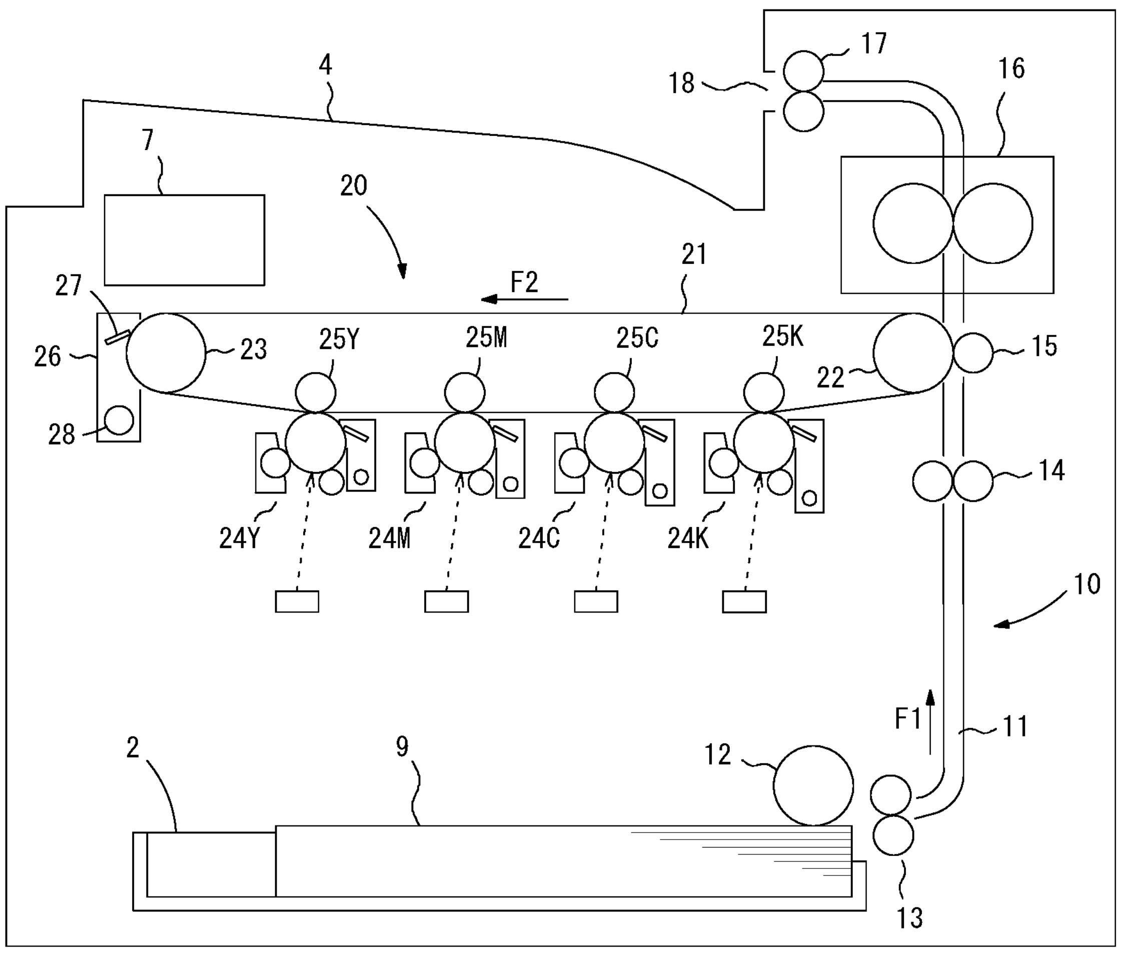
FIGS. 2A and 2B are diagrams illustrating a printer mechanism inside the image forming apparatus.
Figure 2B:
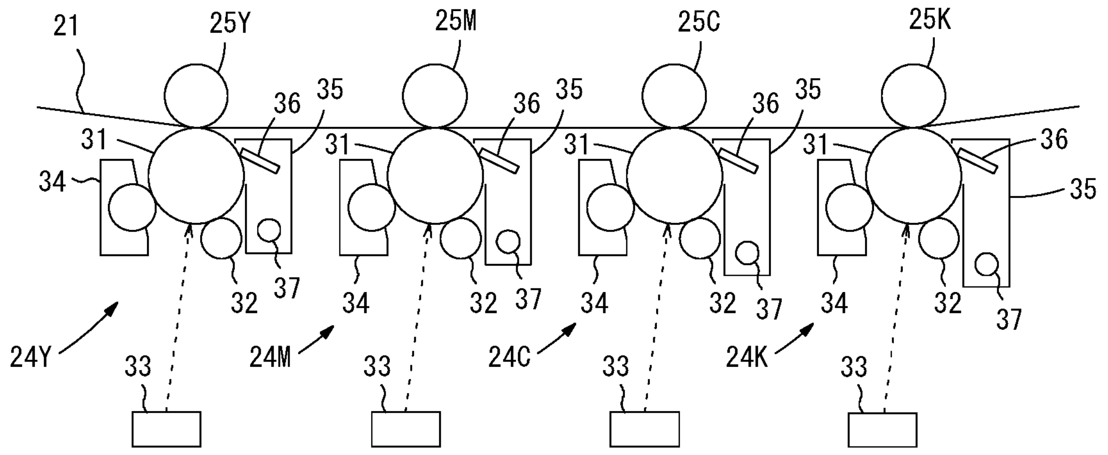

FIGS. 2A and 2B are diagrams illustrating a printer mechanism inside the image forming apparatus 1. As shown in FIG. 2A, the printer mechanism includes a conveying mechanism 10 and an image forming mechanism 20. The conveyance mechanism 10 conveys the sheet 9 stacked in the sheet feed cassette 2 one by one. The image forming mechanism 20 forms an image on the sheet 9.

The conveyance mechanism 10 conveys the sheet 9 along a conveyance path 11 formed inside the image forming apparatus 1. The conveyance direction of the sheet 9 is a direction indicated by arrow F1. The conveyance mechanism 10 includes a pickup roller 12, a paper feed roller 13, a registration roller 14, a secondary transfer roller 15, a fixing section 16, and a discharge roller 17. The conveying mechanism 10 conveys the sheet 9 one by one by rotationally driving those rollers.

The image forming mechanism 20 forms an image by transferring a toner image onto one surface of the sheet 9 conveyed by the conveying mechanism 10. The image forming mechanism 20 includes an intermediate transfer belt 21. The intermediate transfer belt 21 is an endless belt. The intermediate transfer belt 21 is stretched between a driving roller 22 and a driven roller 23, and circularly moves in a direction of an arrow F2. The image forming mechanism 20 includes image forming units 24Y, 24M, 24C, and 24K that form toner images of respective colors of Y (yellow), M (magenta), C (cyan), and K (black) below the intermediate transfer belt 21. The image forming mechanism 20 includes primary transfer rollers 25Y, 25M, 25C, and 25K provided at positions facing the respective image forming units 24Y, 24M, 24C, and 24K with the intermediate transfer belt 21 interposed therebetween.

FIG. 2B is an enlarged diagram of the image forming units 24Y, 24M, 24C, and 24K and the primary transfer rollers 25Y, 25M, 25C, and 25K. The image forming units 24Y, 24M, 24C, and 24K have the same configuration. Each of the image forming units 24Y, 24M, 24C, and 24K has a drum-shaped photoreceptor 31 provided as an image bearing member. Each of the image forming units 24Y, 24M, 24C, and 24K includes a charging device 32, an exposure device 33, a developing device 34, and a cleaner 35 along the outer peripheral surface of the photoreceptor 31. The photoreceptor 31 is rotationally driven in a predetermined direction (in the case of the drawing, clockwise direction).

The charging device 32 charges the surface of the rotating photoreceptor 31 to a predetermined charge. The exposure device 33 exposes the surface of the photoreceptor 31 charged to a predetermined charge based on image data to be printed. The exposure device 33 forms an electrostatic latent image corresponding to image data on the surface of the photoreceptor 31 by exposure. The developing device 34 applies a developer containing toner to the surface of the photoreceptor 31. The developing device 34 visualizes and develops the electrostatic latent image with toner by providing a developer. Thus, a toner image is formed on the surface of the photoreceptor 31. When the toner images contact the intermediate transfer belt 21, the toner images are primarily transferred to the intermediate transfer belt 21 by transfer voltages applied from the primary transfer rollers 25Y, 25M, 25C, and 25K. The image forming units 24Y, 24M, 24C, and 24K sequentially transfer toner images of respective colors of Y, M, C, and K to the intermediate transfer belt 21. Thus, a color image is formed on the intermediate transfer belt 21. When the color image formed on the intermediate transfer belt 21 passes through the position of the secondary transfer roller 15, the color image is secondarily transferred onto one surface of the sheet 9 conveyed by the conveyance mechanism 10. The sheet 9 to which the toner image has been transferred by the secondary transfer roller 15 is subjected to a heating process and a pressing process when passing through the fixing section 16. As a result, the toner image is fixed to the sheet 9.

Toner may remain on the surfaces of the photoreceptor 31 that have passed through the positions of the primary transfer rollers 25Y, 25M, 25C, and 25K. The cleaner 35 removes the residual toner from the surface of the photoreceptor 31. The cleaner 35 includes a blade-like cleaning member 36 that comes into contact with the surface of the photoreceptor 31. The cleaning member 36 collects residual toner as waste toner inside the cleaner 35 by scraping off the residual toner from the surface of the photoreceptor 31. Furthermore, a conveyance member 37 for conveying the collected waste toner is provided inside the cleaner 35. For example, the conveying member 37 is constituted by a screw member extending in a direction parallel to the rotation axis of the photoreceptor 31.

Furthermore, toner may also remain on the surface of the intermediate transfer belt 21 that has passed through the position of the secondary transfer roller 15. In order to collect the residual toner of the surface of the intermediate transfer belt 21, a cleaner 26 is provided near the driven roller 23 as shown in FIG. 2A. The cleaner 26 includes a blade-shaped cleaning member 27 that comes into contact with the surface of the intermediate transfer belt 21. The cleaning member 27 scrapes off the residual toner from the surface of the intermediate transfer belt 21, and collects it as waste toner inside the cleaner 26. Furthermore, a conveyance member 28 for conveying the collected waste toner is provided inside the cleaner 26. For example, the conveying member 28 is constituted by a screw member extending in a direction parallel to the rotation axis of the driven roller 23.

Figure 3:
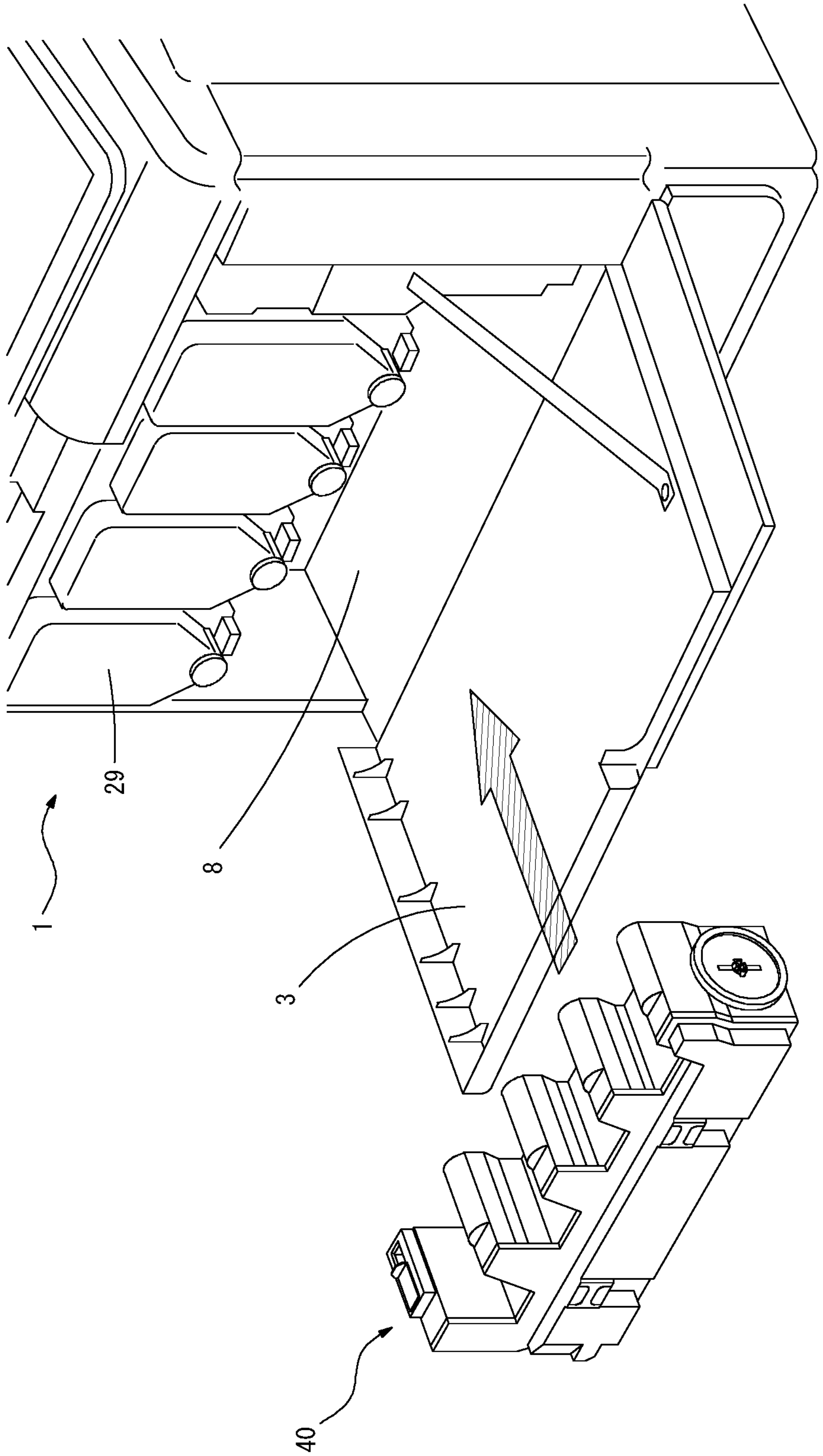
FIG. 3 is a diagram illustrating a state in which the openable door of the image forming apparatus is opened.

FIG. 3 is a diagram showing a state where the openable door 3 of the image forming apparatus 1 is opened. As shown in FIG. 3, when the openable door 3 is opened, the toner bottles 29 of Y, M, C, and K are mounted on the upper portion of the front surface side of the image forming apparatus 1. A space 8 in which the toner container 40 can be mounted is formed below the toner bottle 29. The toner container 40 stores waste toner collected by the cleaners 35, 26 described above in a state where the toner container 40 is attached to the space 8. The toner container 40 is a replaceable component that is replaced with a new one when the inside of the toner container 40 is filled with waste toner. Therefore, the image forming apparatus 1 is configured such that the toner container 40 can be easily attached and detached by opening the openable door 3.

Figure 4:
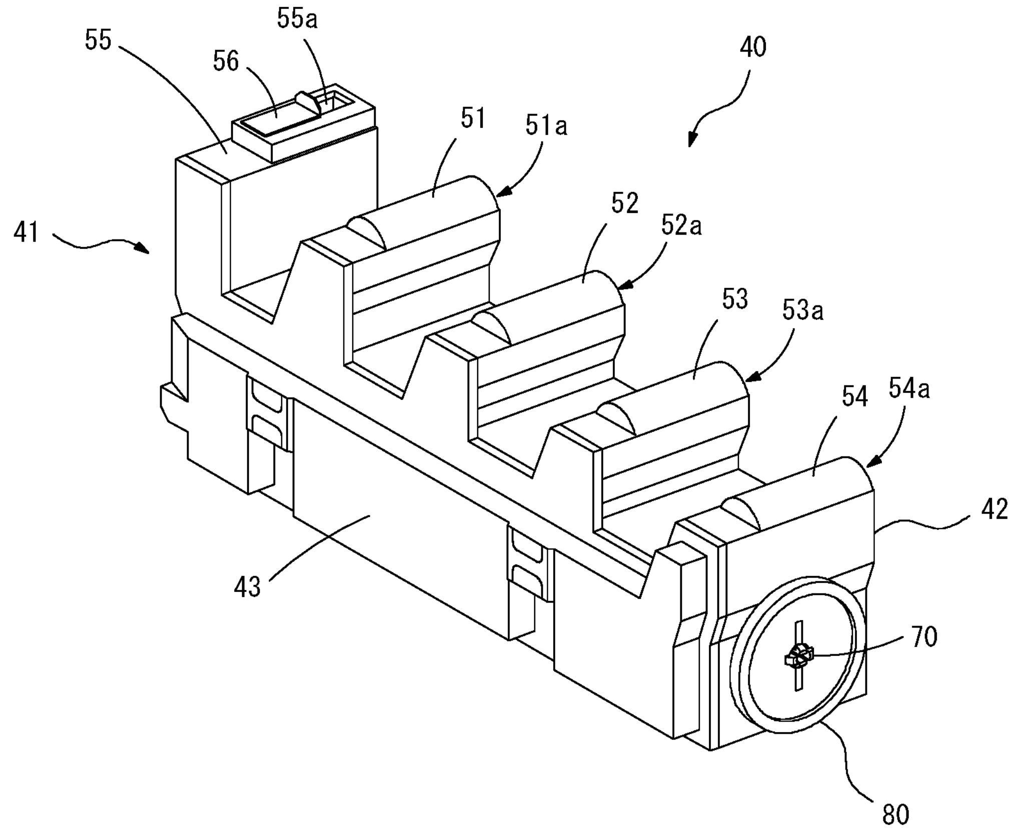
FIG. 4 is a perspective view illustrating an appearance configuration of a toner container.
Figure 5:
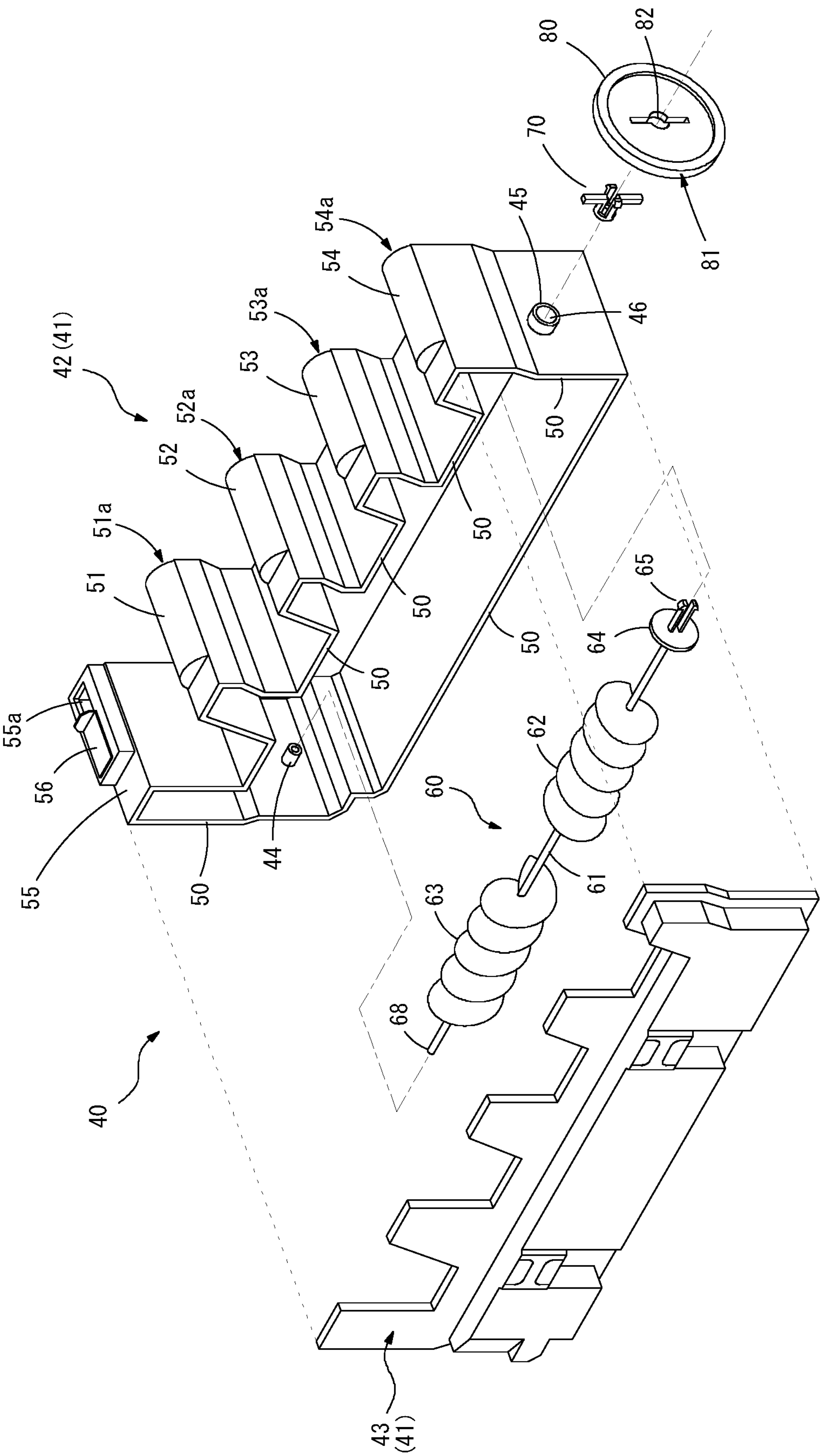
FIG. 5 is an exploded perspective view showing components of the toner container.

FIG. 4 is a perspective view illustrating an appearance configuration of the toner container 40. FIG. 5 is an exploded perspective view showing components of the toner container 40. The toner container 40 includes a container 41, a stirring member 60, an engaging member 70, and a drive transmission member 80. The container 41 contains toner. The stirring member 60 is provided inside the container 41 and rotates around an axis to stir the toner inside the container 41. The engaging member 70 is attached to one end of the stirring member 60 and engages with a peripheral edge portion of the opening 46 formed in the container 41. The drive transmission member 80 is attached to the engaging member 70 and rotates the stirring member 60 around the axis.

The container 41 is integrally formed by welding the container body 42 and the cover member 43. The container body 42 is open on the front surface side, and the open peripheral edge part is formed as a joining part 50 to which the cover member 43 is joined.

Toner collection portions 51, 52, 53, 54, and 55 that protrude upward are provided in the upper portion of the container main body 42. The toner collection portions 51, 52, 53, and 54 collect waste toner ejected from the cleaners 35 of the image forming units 24Y, 24M, 24C, and 24K. Openings 51*a*, 52*a*, 53*a*, and 54*a* for receiving the waste toner transported by the conveyance member 37 provided in each cleaner 35 are formed on the rear surface side of the toner collection portions 51, 52, 53, and 54. Furthermore, the toner collection portion 55 collects waste toner ejected from the cleaner 26 that collects residual toner on the intermediate transfer belt 21. An opening 55*a* for receiving the toner discharged from the cleaner 26 is provided on the upper surface of the toner collecting portion 55. The opening 55*a* can be opened and closed by a shutter member 56. The shutter member 56 is urged by an elastic body such as a spring so as to close the opening 55*a*. As the toner container 40 is attached to the image forming apparatus 1, the shutter member 56 slides on the upper surface of the toner collection portion 55 against the biasing force of the elastic body to open the opening 55*a*.

As illustrated in FIG. 5, a bearing portion 44 that supports an end portion of the stirring member 60 is provided on the inner side of one side surface of the container body 42. Further, on the other side surface of the container main body 42, a sleeve 45 protruding to the outside of the toner container 40 is provided coaxially with the bearing portion 44. An opening 46 (a through hole) that penetrates to the inside of the container body 42 is formed on the inner side of the sleeve 45.

The cover member 43 covers the open front surface side of the container body 42 and is welded to the joining part 50. By being welded to the front surface side of the container body 42, the cover member 43 is integrated with the container body 42 to form the container 41 in which the inside is sealed. For example, the container body 42 and the cover member 43 in the present embodiment are formed of a resin, and are welded and fixed in a uniform state over the entire region of the joining part 50 by vibration welding. As a result, the container body 42 and the cover member 43 can form the container 41 in which the toner leakage does not occur.

The stirring member 60 is for stirring and leveling the toner carried into the container 41 from the toner collecting portions 51, 52, 53, 54, and 55. The stirring member 60 includes a shaft portion 61, a first stirring portion 62, and a second stirring portion 63. Further, the stirring member has a flange portion 64 and a locking portion 65 at one end of the shaft portion 61. In the stirring member 60, inside the container body 42, one end of the shaft portion 61 having the locking portion 65 is inserted into the opening 46 of the container body 42, and the other end 68 is supported by the bearing portion 44 of the container body 42.

The first stirring portion 62 is provided on one end side with respect to the center of the shaft portion 61, and conveys the toner in the container 41 toward the center of the container 41 while stirring the toner as the shaft portion 61 rotates in a predetermined direction. The second stirring section 63 is provided closer to the other end than the center of the shaft portion 61, and conveys the toner in the container 41 toward the center of the container 41 while stirring the toner by rotation of the shaft portion 61 in the predetermined direction. For example, the first stirring section 62 and the second stirring section 63 include screw vanes having different directions. Therefore, when the shaft portion 61 rotates in the predetermined direction, the first stirring portion 62 and the second stirring portion 63 can collect and level the toner in the container 41 at the center while stirring the toner.

The engaging member 70 is formed to be smaller in size than the drive transmission member 80. The engaging member 70 is attached from the outside of the container 41 while being locked to a locking portion 65 provided at one end of the stirring member 60. The engagement member 70 is a member for attaching the drive transmission member 80 to one end of the stirring member 60.

The drive transmission member 80 is a disk-shaped member having a gear formed on an outer peripheral surface 81 thereof. An engaging hole 82 that engages with the engaging member is formed at the center of the drive transmission member 80. By fitting the engaging member 70 into the engaging hole 82, the drive transmission member 80 is attached to one end of the stirring member 60 outside the container 41.

When the toner container 40 is mounted in the space 8 on the front surface side of the image forming apparatus 1, the outer peripheral surface 81 of the drive transmission member 80 is coupled to a gear of a drive section (not shown) provided inside the image forming apparatus 1. The drive section is rotationally driven by a motor provided inside the image forming apparatus 1. Therefore, when the drive section is rotationally driven, the drive transmission member 80 causes the stirring member 60 in the container 41 to rotate in the predetermined direction via the engaging member 70. Thus, the toner in the container 41 is stirred, and the state of accumulation of the toner in the container 41 can be made uniform. For example, a radius of the drive transmission member is formed to be larger than a radius of the drive section, and the stirring member 60 is configured to be rotationally driven at a predetermined number of rotations or less. Here, there is another method in which a deceleration mechanism is provided in a drive mechanism mounted on the apparatus body 1*a* of the image forming apparatus 1 so that the number of rotations of the stirring member 60 is suppressed low on the side of the apparatus body 1*a*. However, it is difficult to reduce the size of the apparatus body 1*a* when the reduction mechanism is provided in the apparatus body 1*a*. Therefore, in the image forming apparatus 1 of the present embodiment, by increasing the size of the drive transmission member 80, the number of rotations of the stirring member 60 is suppressed to be low, and the miniaturization of the apparatus body 1*a* is realized.

As described above, the toner container 40 of the present embodiment employs a configuration in which the engaging member 70 is attached to one end of the stirring member 60, and the drive transmission member 80 is attached to the engaging member 70. By employing such a configuration, when the drive transmission member 80 is attached to one end of the stirring member 60, the stirring member 60 is not deformed or broken. Hereinafter, a method for manufacturing the toner container 40 and constituent members of the toner container 40 will be described in detail.

Figure 6A:
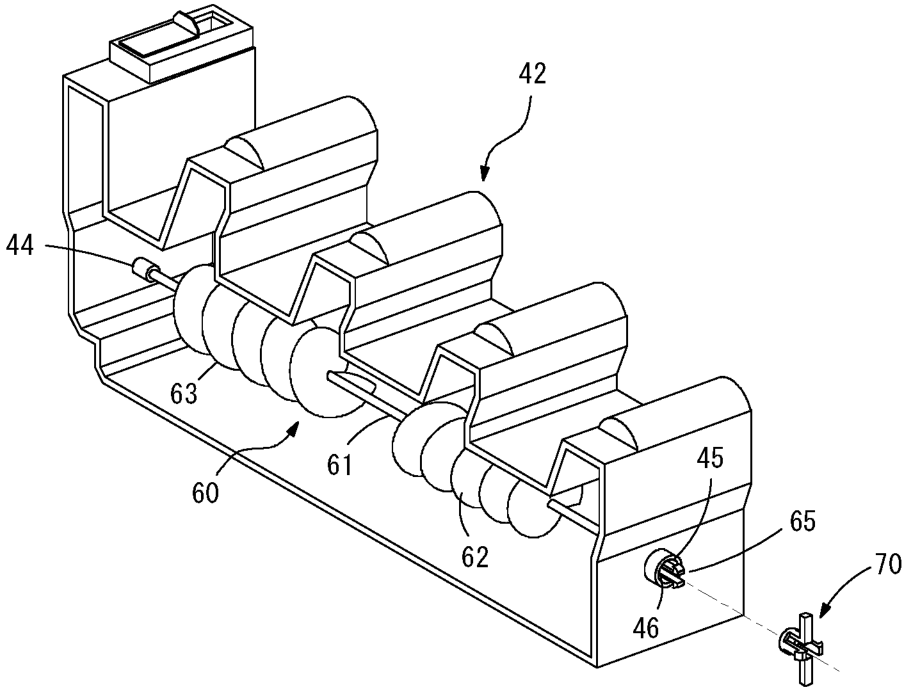
FIGS. 6A and 6B are diagrams illustrating a manufacturing process of the toner container.

FIGS. 6A and 6B to FIG. 10 are diagrams illustrating the processes of manufacturing the toner container 40. When manufacturing the toner container 40 of the present embodiment, first, as shown in FIG. 6A, the stirring member 60 is installed inside the container body 42. That is, the locking portion 65 provided at one end of the stirring member 60 is inserted into the opening 46 from the inside of the container body 42, and the other end 68 of the stirring member 60 is inserted into the bearing portion 44 inside the container body 42 to install the stirring member 60 inside the container body 42. This causes the locking portion 65 of the stirring member 60 to protrude from the opening 46 to the outside of the container body 42.

Figure 6B:
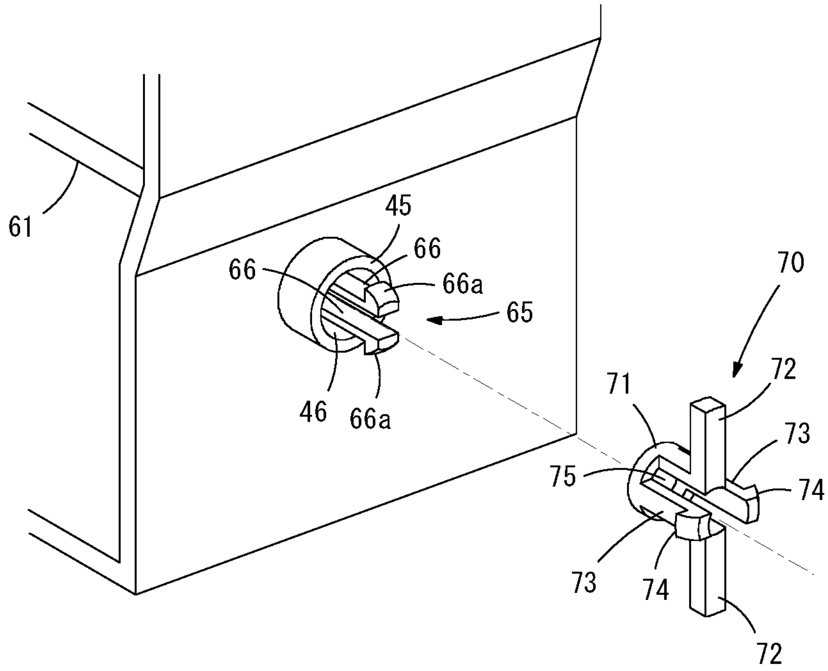

FIG. 6B is an enlarged view of the sleeve 45 and its periphery of the container body 42. The locking portion 65 projecting from the end of the sleeve 45 has a pair of locking pieces 66 and 66 parallel to each other at a predetermined interval, and at the tip ends of the pair of locking pieces 66 and 66, locking claws 66*a* and 66*a* are formed toward the outside of the sleeve 45. Therefore, when the stirring member 60 is installed inside the container body 42, as shown in FIG. 6B, the pair of locking pieces 66 and 66 and the locking claws 66*a* and 66*a* protrude from the tube end of the sleeve 45.

Next, as illustrated in FIGS. 6A and 6B, the engaging member 70 is attached to the pair of locking pieces 66 and 66 protruding from the sleeve 45. As shown in FIG. 6B, the engaging member 70 includes a ring portion 71, a pair of engagement portions 72 and 72 and a pair of locking pieces 73 and 73. The ring portion 71 is capable of accommodating the pair of locking pieces 66 and 66 inside. The pair of engagement portions 72 and 72 are L-shaped protruding pieces provided at positions of the ring portion 71 that are rotated by 180 degrees from each other. The pair of locking pieces 73 and 73 are provided so as to be protruded from the ring part 71 at a position further rotated by 90 degrees from each of the pair of engagement portions 72 and 72. Locking claws 74 and 74 formed toward the outside of the ring portion 71 are provided at the distal ends of the pair of locking pieces 73 and 73. The engaging member 70 is attached to the locking portion 65 of the stirring member 60 by inserting the engaging member 70 into the sleeve 45 while accommodating the locking pieces 66, 66 inside the ring portion 71. In other words, the engaging member 70 is attached to the locking portion 65 by fitting the ring portion 71 on the outside of the locking portion 65 provided at one end of the stirring member 60.

Here, it is preferable that the locking portion 65 is provided with a projection portion (not shown) which is fitted into the gap 75 between the engagement portion 72 and the locking piece 73 when the engaging member 70 is fitted. By fitting the projection portion into the gap 75, the locking portion 65 is integrated with the engaging member 70 in the rotating direction. Therefore, when the engaging member 70 rotates, the stirring member 60 also rotates together with the engaging member 70.

When the engaging member 70 is engaged with the locking portion 65, stress acts on the shaft portion 61 of the stirring member 60. This stress acts as a compressive force that compresses the shaft portion 61 in the axial direction. Therefore, in a case where the shaft portion 61 is not fixed, the shaft portion 61 may be deformed inside the container body 42, and the shaft portion 61 may be bent in the worst case. To avoid it, as shown in FIG. 6B, when the engaging member 70 is fitted to the locking portion 65, a hand is inserted into the container body 42, and the engaging member 70 is fitted in a state where the shaft portion 61 is fixed by the hand. By fixing the shaft portion 61 by hand, deformation of the shaft portion 61 can be suppressed, and the shaft portion 61 can be prevented from being broken. That is, in the toner container 40 of the present embodiment, before the cover member 43 is welded to the container body 42, the process is performed in which the stirring member 60 is placed inside the container body 42 and the engaging member 70 is attached to one end of the stirring member 60.

When the pair of locking pieces 66 and 66 are accommodated on the inner side of the ring portion 71 and the engaging member 70 is fitted on the outer side of the locking portion 65, the locking claws 66*a* and 66*a* of the pair of locking pieces 66 and 66 are brought into a state of being locked to the pair of engagement portions 72 and 72 of the engaging member 70. Accordingly, the engaging member 70 is not separated from the locking portion 65.

Further, the pair of engagement portions 72 and 72 of the engaging member 70 extends outward longer than the radius of the sleeve 45. Therefore, when the engaging member 70 is fitted to the outside of the locking portion 65, the distal ends of the engagement portions 72 and 72 protrude to the outside of the sleeve 45 and are in contact with the end surface of the sleeve 45 (see FIG. 9). That is, the engaging member 70 is in a state of being engaged with the peripheral edge part of the opening 46 formed in the container body 42. Thus, the position of the engaging member in the axial direction of the stirring member 60 is fixed. Even if a force that pushes the engaging member 70 into the container body 42 acts thereafter, the engaging member 70 that engages with the end surface of the sleeve 45 functions as a stopper. Therefore, the engaging member 70 is a member which does not generate a stress which compresses the shaft portion 61 with respect to the stirring member 60.

Figure 7:
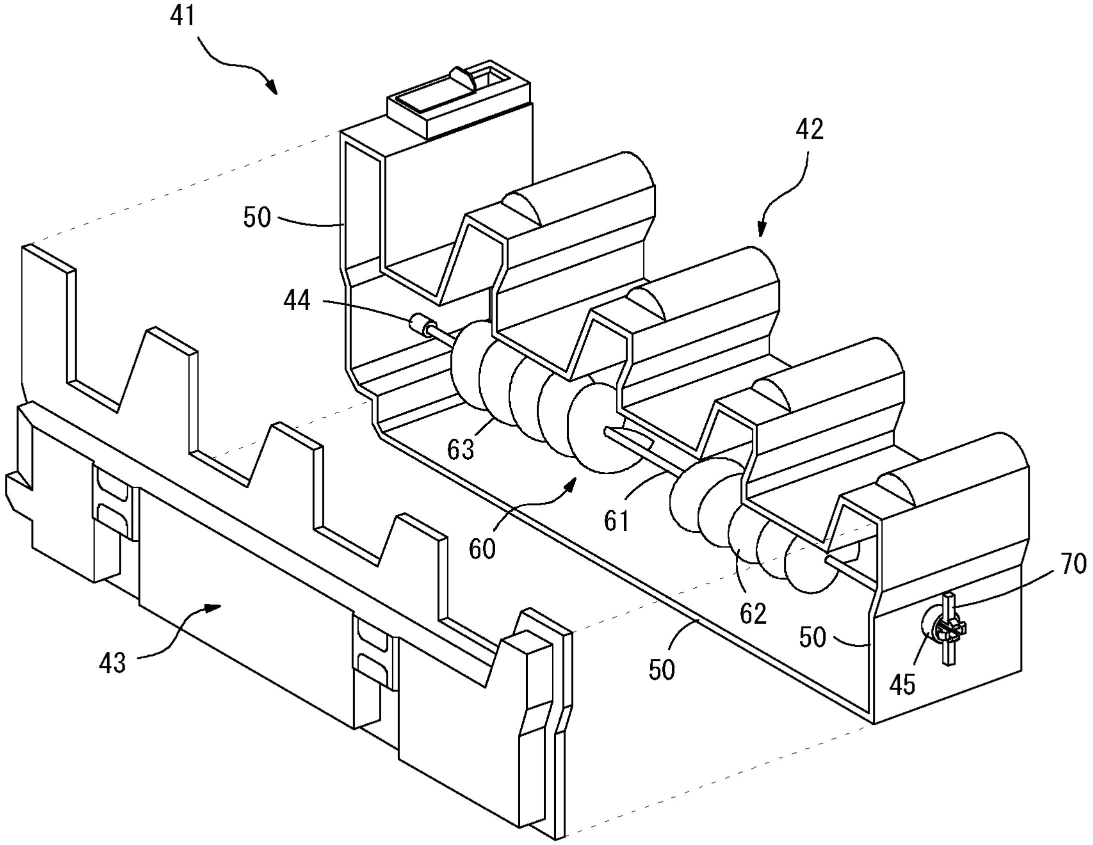
FIG. 7 is a diagram illustrating a process of manufacturing the toner container.

Next, as shown in FIG. 7, the cover member 43 is welded to the container body 42 to form the container 41. As described above, in the present embodiment, the container body 42 and the cover member 43 are welded together by vibration welding. Specifically, each of the container body 42 and the cover member 43 is installed on a jig, the container body 42 and the cover member 43 are joined to each other at the joining part 50, and vibration is applied to the joining part 50 for a predetermined time via the jig to melt the joining part 50, so that the container body 42 and the cover member 43 are welded.

At this time, the toner container 40 is in a state where the drive transmission member 80 having a relatively large size is not mounted. Therefore, the drive transmission member 80 does not interfere with installation of the container body 42 in a jig, thereby enabling appropriate installation of the jig in the container body 42. Therefore, no problem occurs during vibration welding, and the hermeticity of the container 41 can be ensured.

Figure 8A:
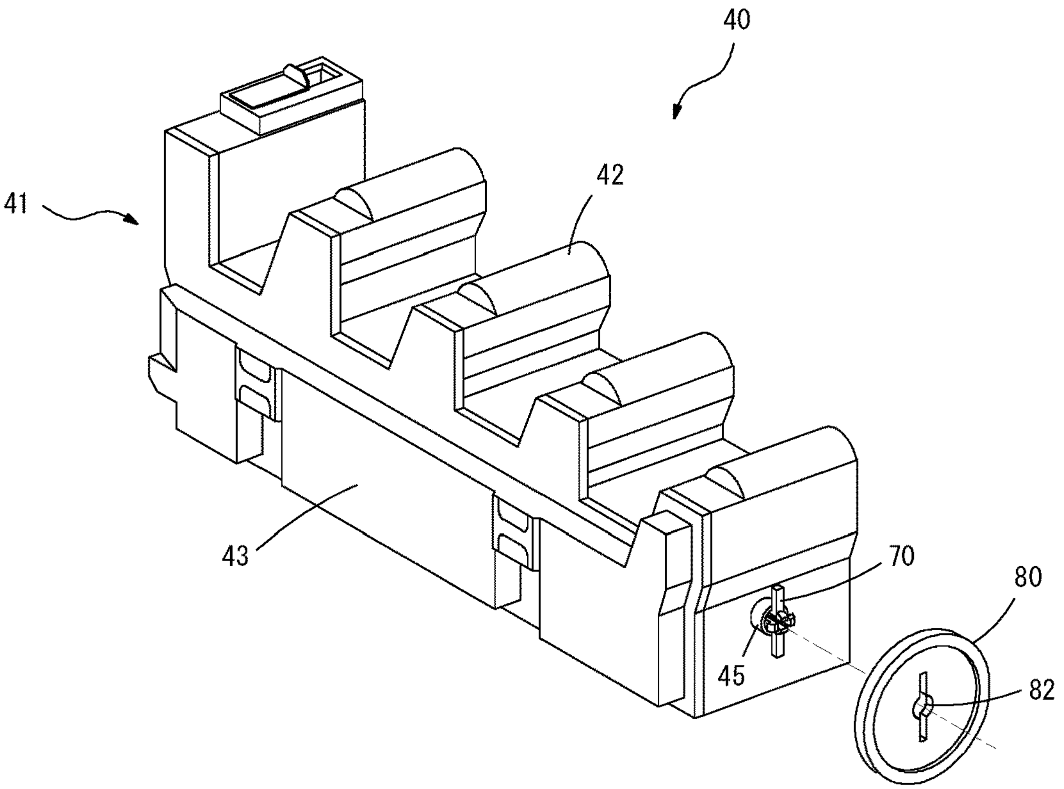
FIGS. 8A and 8B are diagrams illustrating a process of manufacturing the toner container.
Figure 8B:
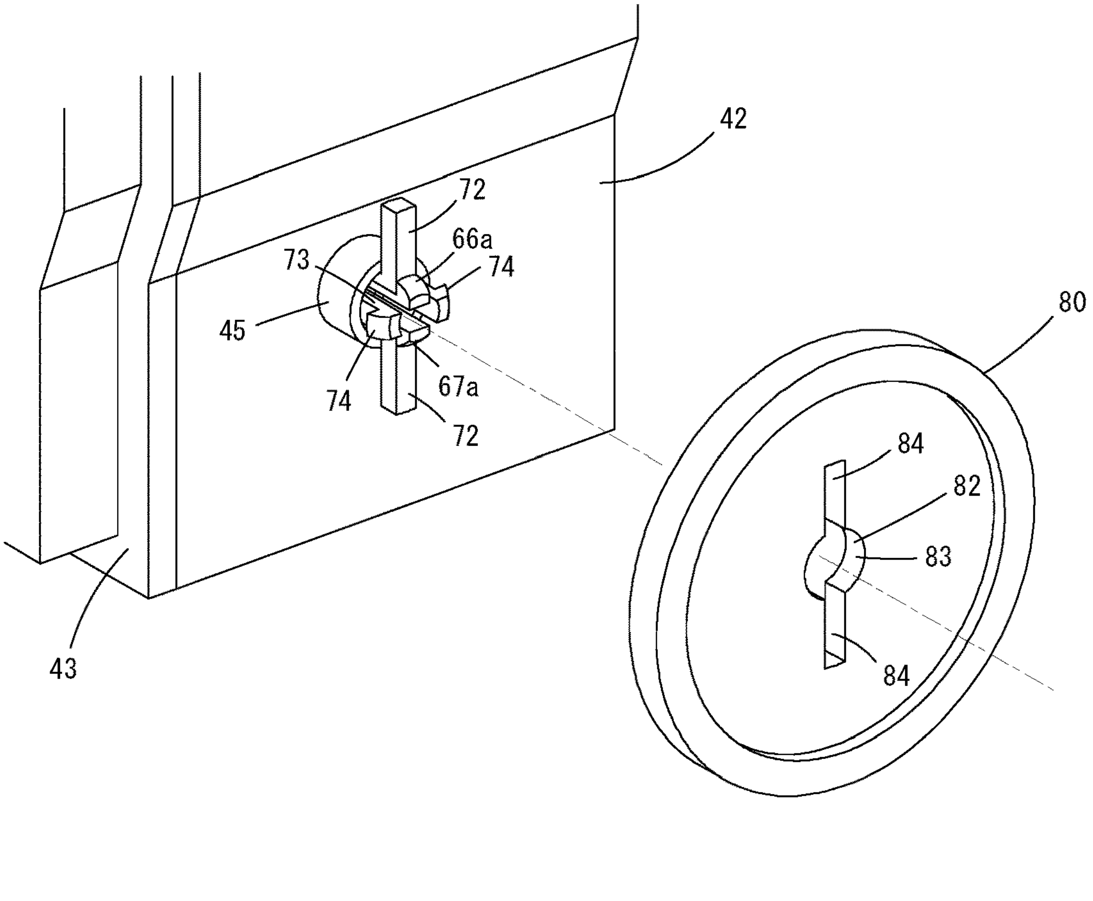

When the cover member 43 is welded to the container body 42, next, as illustrated in FIGS. 8A and 8B, the drive transmission member 80 is mounted on the engaging member 70.

FIG. 8B is an enlarged view of the sleeve 45 of the container body 42 and its periphery. The engaging hole 82 formed at the center of the drive transmission member 80 has a circular hole 83 at the center and a pair of long holes 84 and 84 extending outward from the circular hole 83. The long holes 84 and 84 are at positions rotated by 180 degrees from each other, and the pair of engagement portions 72 and 72 provided on the engaging member 70 can be fitted into the long holes 84 and 84. Further, the diameter of the circular hole 83 is substantially equal to the arrangement interval between the pair of locking pieces 73 and 73 provided in the engaging member 70. Such a drive transmission member 80 is mounted so as to accommodate the engaging member 70 inside the engagement hole 82 with the positions of the long holes 84 and 84 aligned with the positions of the pair of engagement portions 72 and 72.

Figure 9:
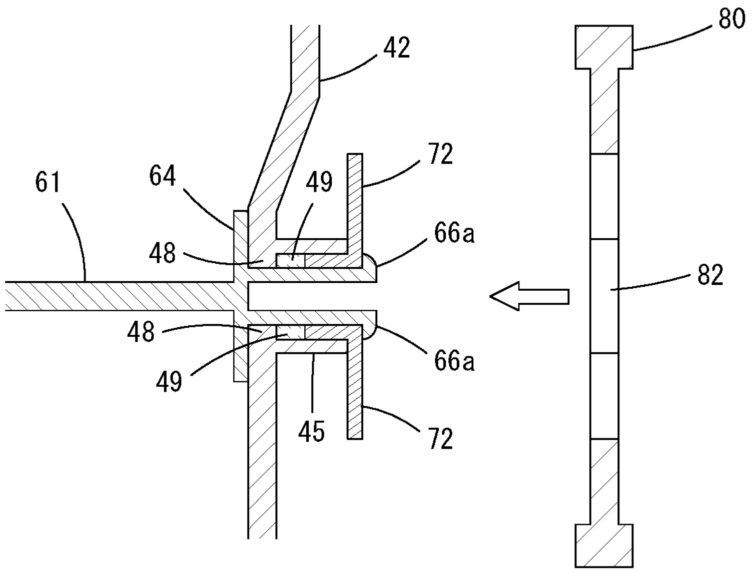
FIG. 9 is a diagram illustrating a cross-sectional structure when the drive transmission member is attached to the engaging member.

FIG. 9 is a diagram illustrating a cross-sectional structure when the drive transmission member 80 is attached to the engaging member 70. When the drive transmission member 80 is mounted to the engaging member 70, the engagement portions 72 and 72 of the engaging member are in contact with the end surface of the sleeve 45 as shown in FIG. 9. Therefore, when the drive transmission member 80 is attached to the engaging member 70, even if the engaging member 70 is pushed into the container body 42, the engaging member 70 does not apply stress to the shaft portion 61 of the stirring member 60. Therefore, no excessive stress is applied to the shaft portion 61 of the stirring member 60, and it is possible to prevent deformation or breakage of the shaft portion 61.

As shown in FIG. 9, the container body 42 has a seal member 49 inside the opening 46 formed by the sleeve 45. The seal member 49 illustrated in FIG. 9 is provided between the wall portion 48 provided inside the sleeve 45 and the engaging member 70 (more specifically, the ring portion 71). For example, the sealing member 49 is made of felt, and is compressed and expanded by inserting the engaging member 70 into the sleeve 45 to seal the inside of the sleeve 45. Thus, toner leakage through the opening 46 of the sleeve 45 is prevented. Note that the material of the seal member 49 is not limited to felt, and a fibrous material other than felt may be used. The seal member 49 may be made of an elastic material such as rubber.

Figure 10:
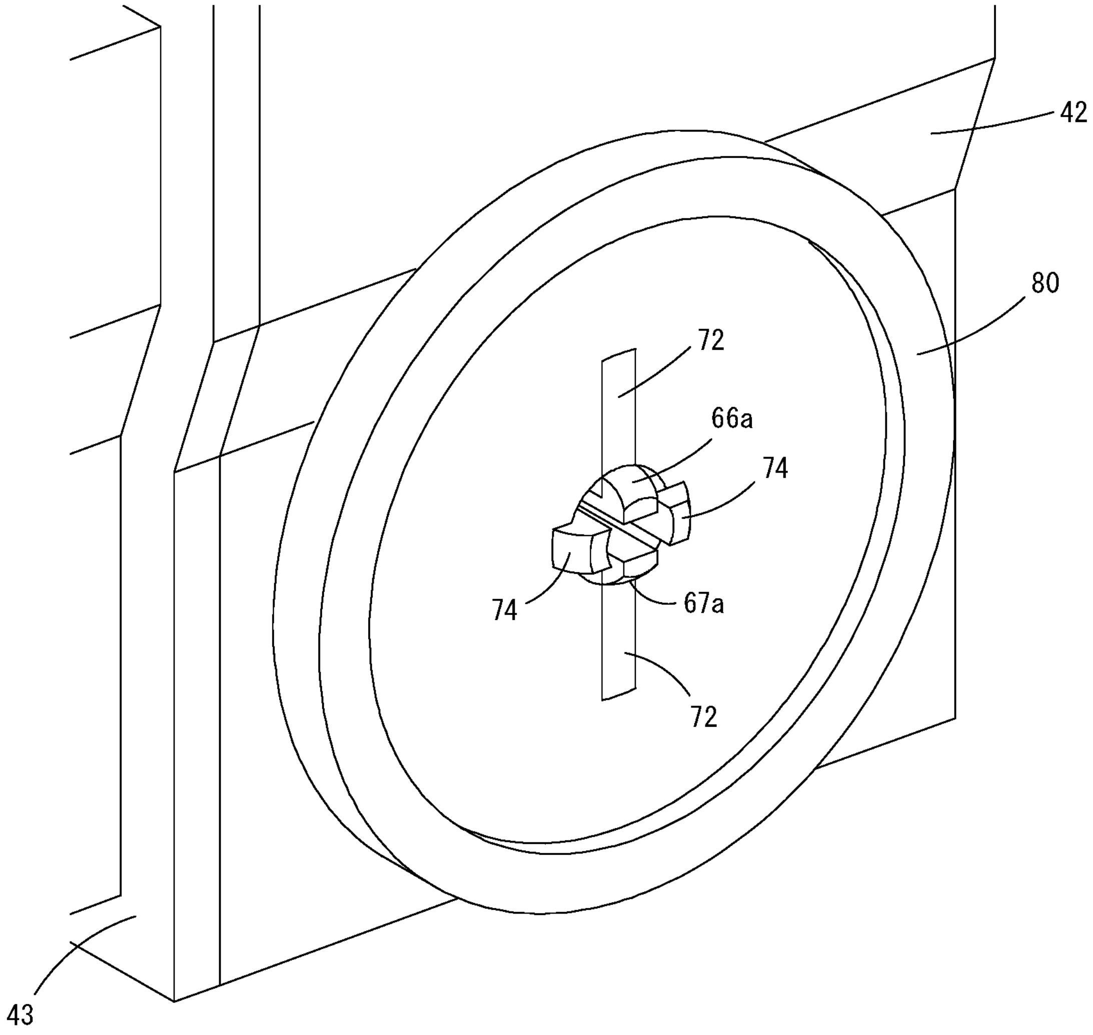
FIG. 10 is an enlarged diagram showing a state in which the drive transmission member is mounted to the engaging member.

FIG. 10 is an enlarged diagram illustrating a state in which the drive transmission member 80 is attached to the engaging member 70. When the drive transmission member 80 is attached to the engaging member 70, the engagement portions 72 and 72 of the engaging member 70 are fitted into and engaged with the long holes 84 and 84. Accordingly, when the drive transmission member 80 rotates, the engaging member 70 also rotates together with the drive transmission member 80. At this time, the engagement portions 72 and 72 of the engaging member 70 slide along the peripheral edge portion of the opening 46 in a state of being engaged with the peripheral edge portion. Therefore, the engaging member 70 can enable the stirring member 60 to rotate smoothly.

Further, when the drive transmission member 80 is attached to the engaging member 70, the locking claws 74 and 74 provided at the distal ends of the locking pieces 73 and 73 of the engaging member 70 are engaged with the peripheral edge portion of the circular hole 83. Accordingly, the drive transmission member 80 is fixed so as not to separate from the engaging member 70. However, when the pair of locking claws 74 and 74 are pinched by fingertips and the interval between the locking claws 74 and 74 is reduced, the engagement state by the locking claws 74 and 74 is easily released. Therefore, it is also possible to easily remove the drive transmission member 80 from the engaging member 70.

Figure 11:
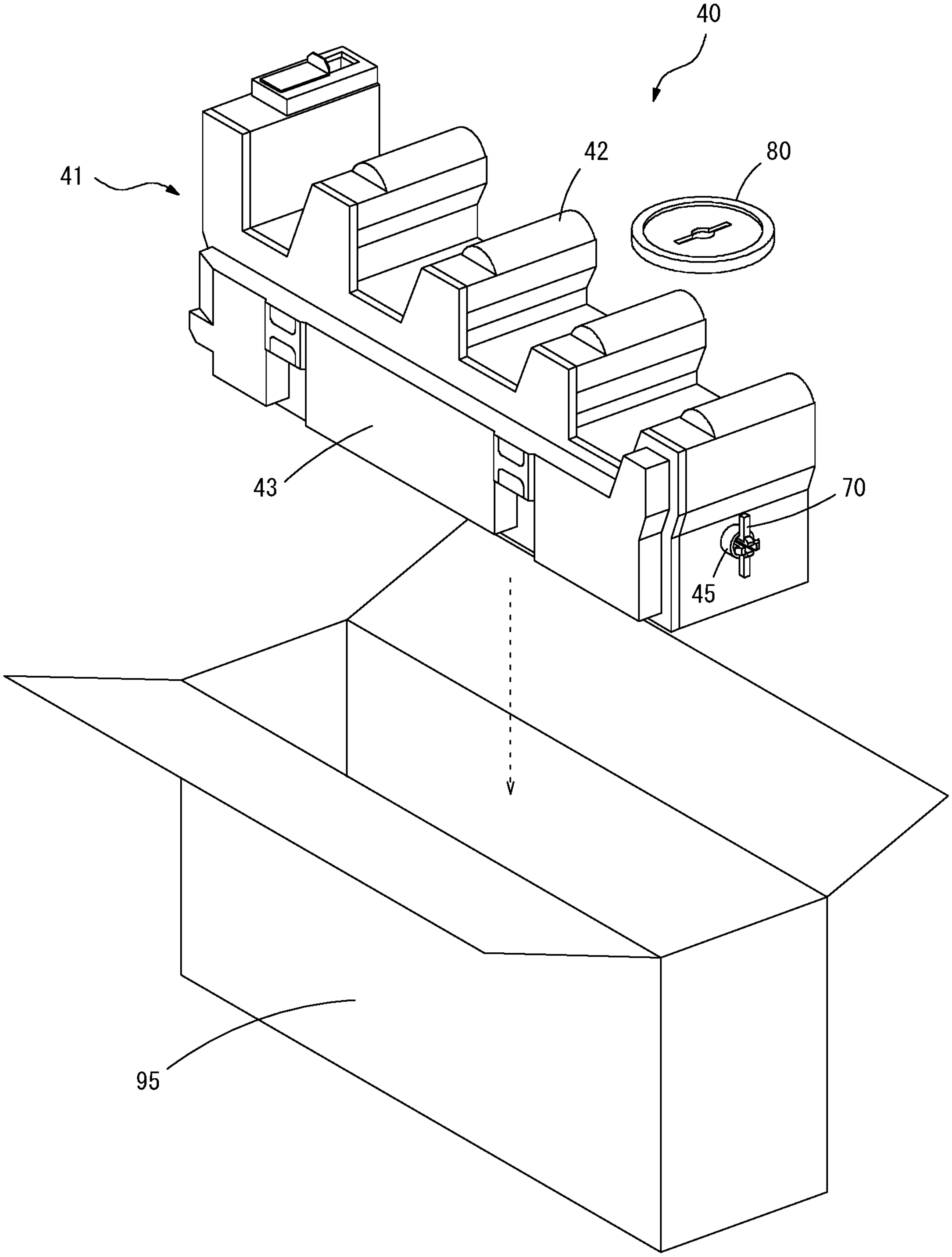
FIG. 11 is a diagram illustrating a packing state when the toner container is shipped.

The process of attaching the drive transmission member 80 to the engaging member 70 may be performed at a factory. Further, the process of attaching the drive transmission member 80 to the engagement member 70 may be performed at a site where the image forming apparatus 1 is installed. FIG. 11 is a diagram illustrating an example in which the drive transmission member 80 is packed together with the container 41 in a state in which the drive transmission member 80 is not mounted to the engaging member 70 when the toner container 40 is shipped. As illustrated in FIG. 11, the container 41 in a state in which the drive transmission member 80 is not mounted and the drive transmission member 80 are shipped in a state of being packed together in one packing box and thus it is possible to reduce the size of the packing box 95 and transport efficiency is excellent. Further, since the drive transmission member 80 is detached from the engaging member it is possible to restrain a load from being applied to the engaging member 70 during transportation. Therefore, there is also an advantage that it is possible to suppress the engaging member 70 and the drive transmission member 80 from being damaged during transportation.

In particular, in the toner container 40 of the present embodiment, even when a user or a service person attaches the drive transmission member 80 to the engaging member 70 at a site where the image forming apparatus 1 is installed, there is no possibility that the stirring member 60 inside the container 41 is damaged at the time of attaching the drive transmission member 80. Therefore, a user or a service person can appropriately mount the drive transmission member 80 at the installation site of the image forming apparatus 1.

As described above, the toner container 40 of the present embodiment includes the container 41 that contains the toner, the stirring member 60 that is provided inside the container 41 and rotates around the axis to stir the toner, the engaging member 70 that is attached to one end of the stirring member 60 and engages with the peripheral edge of the opening 46 formed in the container 41, and the drive transmission member 80 that is attached to the engaging member 70 and rotates the stirring member 60 around the axis. According to such a configuration, when the drive transmission member 80 is attached to one end of the stirring member 60, the stirring member 60 is not deformed or broken, and the toner container 40 can be stably completed.

Modifications

Several preferred embodiments of the present invention have been described above. However, the present invention is not limited to the content described in the above embodiments, and various modifications can be applied.

For example, in the above-described embodiment, an example in which the seal member 49 provided inside the sleeve 45 is disposed between the wall portion 48 and the engaging member has been described. That is, in the example illustrated in FIG. 9, the seal member 49 is disposed on the outer side of the wall portion 48. However, the place where the seal member 49 is arranged is not limited thereto.

Figure 12:
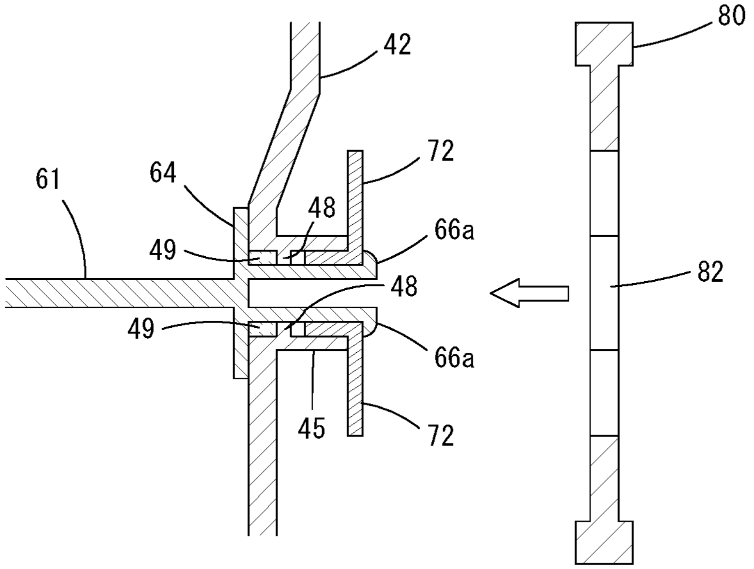
FIG. 12 is a cross-sectional diagram illustrating a configuration example in which a seal member is provided at a position different from that of FIG. 9.

FIG. 12 is a cross-sectional diagram showing an example in which the seal member 49 is provided at a position different from that in FIG. 9. In the example illustrated in FIG. 12, the seal member 49 is disposed on an inner side of the wall portion 48. Specifically, the seal member 49 is provided between the wall portion 48 provided inside the sleeve 45 and the flange portion 64 of the stirring member 60. When the locking claws **66*a* and 66*a* provided at the distal end of the locking portion 65 of the stirring member 60 engage with the engaging member 70, the flange portion 64 of the stirring member 60 is pulled toward the distal end of the sleeve 45 and comes into contact with the inner wall of the container body 42. At this time, the seal member 49 provided between the wall portion 48 and the flange portion 64 is compressed and expanded by the pressing force from the flange portion 64 to seal the inside of the sleeve 45. In this case, the seal member 49 can be attached to the flange portion 64 in advance, which is excellent in working efficiency. Therefore, a configuration in which the seal member 49 is provided at the position illustrated in FIG. 12** may be adopted.

Further, in the above-described embodiment, the case where the toner container 40 is a container for collecting the waste toner is exemplified. However, a container to which the above-described configuration of the toner container 40 is applicable is not limited to a container that collects waste toner. For example, the above-described configuration can be applied to the developing device 34, and can also be applied to the cleaners 26 and 35.

In addition, in the above-described embodiment, the case where the image forming apparatus 1 is a color machine capable of forming a color image using toners of four colors of Y, M, C, and K has been exemplified. However, the image forming apparatus 1 is not limited to a color machine, and may be a monochrome machine capable of forming only a monochrome image.

Further, in the above-described embodiment, the case where the container 41 is formed by welding two components of the container body 42 and the cover member 43 has been exemplified. However, the number of components forming the container 41 is not limited to two, and may be three or more.

What is claimed is:

1. A toner container comprising:
a container for containing toner;
a stirring member provided inside the container and configured to stir the toner by rotating around an axis;
an engaging member provided at one end of the stirring member so as to be engaged with a rotational shaft of the stirring member in a rotational direction and a rotational axis direction and configured to engage with a peripheral edge portion of an opening formed in the container, wherein position of the engaging member in an axial direction of the stirring member is fixed; and
a drive transmission member attached to the engaging member so as to be engaged with the engaging member in the rotational direction and the rotational axis direction, and which rotates the stirring member around the axis.

2. The toner container according to claim 1, wherein
the engaging member rotates around the axis integrally with the stirring member
the drive transmission member rotates the stirring member around the axis by rotating the engaging member.

3. The toner container according to claim 1, wherein
the engaging member has an engagement portion that engages with a peripheral edge portion of the opening
the engagement portion slides in a state of being engaged with the peripheral edge portion of the opening when the engaging member rotates.

4. The toner container according to claim 1, wherein
the container is integrally formed by welding a container body and a cover member together.

5. The toner container according to claim 1, wherein
the container includes a seal member at an inner side of the opening.

6. The toner container according to claim 5, wherein
the seal member is disposed outside a wall portion provided inside the opening.

7. The toner container according to claim 5, wherein
the seal member is disposed on an inner side of a wall portion provided inside the opening.

8. The toner container according to claim 1, wherein the drive transmission member is packed together with the container in a state where the drive transmission member is not attached to the engaging member.

9. The toner container according to claim 1, wherein the engaging member is provided between the rotating shaft of the stirring member and an opening surface formed in the container.

10. A method of manufacturing a toner container that comprises: a container formed by a container body and a cover member; a stirring member that is provided inside the container and rotates around an axis to stir the toner; an engaging member provided at one end of the stirring member so as to be engaged with a rotational shaft of the stirring member in a rotational direction and a rotational axis direction and configured to engage with a peripheral edge portion of an opening formed in the container body; and a drive transmission member mounted on the engaging member so as to be engaged with the engaging member in the rotational direction and the rotational axis direction, and which rotates the stirring member about the axis; wherein the method comprises the steps of:

installing the stirring member inside of the container body and attaching the engaging member to one end of the stirring member to bring the engaging member into engagement with the peripheral edge portion of the opening;

forming the container by welding the container body and the cover member to each other after the engaging member is attached to one end of the stirring member; and attaching the drive transmission member to the engagement member after the container is formed.

11. An image forming apparatus comprising:

a toner container that comprises:

a container for containing toner;

a stirring member provided inside the container and configured to stir the toner by rotating around an axis;

an engaging member provided at one end of the stirring member so as to be engaged with a rotating shaft of the stirring member in a rotational direction and a rotational axis direction and configured to engage with a peripheral edge portion of an opening formed in the container, wherein the container includes a seal member within a hole of the opening; and a drive transmission member attached to the engaging member so as to be engaged with the engaging member in the rotational direction and the rotational axis direction, and which rotates the stirring member around the axis.

12. The image forming apparatus according to claim 11, wherein the engaging member rotates around the axis integrally with the stirring member the drive transmission member rotates the stirring member around the axis by rotating the engaging member.

13. The image forming apparatus according to claim 11, wherein the engaging member has an engagement portion that engages with a peripheral edge portion of the opening the engagement portion slides in a state of being engaged with the peripheral edge portion of the opening when the engaging member rotates.

14. The image forming apparatus according to claim 11, wherein the container is integrally formed by welding a container body and a cover member together.

15. The image forming apparatus according to claim 11, wherein the container includes a seal member at an inner side of the opening.

16. The image forming apparatus according to claim 15, wherein the seal member is disposed outside a wall portion provided inside the opening.

17. The image forming apparatus according to claim 15, wherein the seal member is disposed on an inner side of a wall portion provided inside the opening.

18. The image forming apparatus according to claim 11, wherein the engaging member is provided between the rotating shaft of the stirring member and an opening surface formed in the container.

* * * * *